Patented Nov. 2, 1943

2,333,429

UNITED STATES PATENT OFFICE 2,333,429

DIAMOND ABRASIVE ARTICLE

Paul L. Kuzmick, Clifton, N. J., assignor to J. K. Smit & Sons, Inc., New York, N. Y., a corporation of New York No Drawing. Application April 6, 1942, Serial No. 437,857

7 Claims. (Cl. 51—298)

This invention relates to diamond abrasive articles and is particularly directed to abrasive wheels and like abrasive articles wherein diamond abrasive particles or grains are bonded with a synthetic resin.

The prime object of this invention is to produce resin bonded diamond abrasive wheels embodying the combined characteristics of fast cutting ability and unusual durability. Such wheels also possess the ability of producing a superior finish.

Commercial resin bonded diamond abrasive wheels manufactured according to known methods have not combinedly embodied the characteristics of fast cutting ability and high durability. In the attainment of one of these properties it has been necessary in the making of such prior wheels to sacrifice the other of these properties. For example, if fast cutting ability was desired, it was accomplished at the sacrifice of high durability, and if durability was desired, it was accomplished at the sacrifice of fast cutting ability.

In making synthetic resin bonded abrasive wheels, the synthetic resins that have been used were resins of the phenol-aldehyde type. Such resins, the resins dealt with in the practice of the present invention, are those resulting from the condensation and polymerization of phenol and its homologues, and aldehydes such as formaldehyde, its polymer, para formaldehyde, furfural, etc.

In the practice of the prior art methods, the synthetic resins used were and are resins in the so-called A stage.

As is well known, A stage resin is the initial product of condensation. An A stage resin may exist in the solid or liquid phase. Upon heating liquid A stage resin, it thickens gradually becoming pasty, and upon further heating is converted first into B stage and finally into C stage. The main characteristic of solid A stage resin is that it is still fusible, and soluble in solvents such as alcohol and ketones.

Diamond abrasive wheels are molded and cured by combined heat and pressure. The heat and pressure method is used almost exclusively in the production of diamond bonded abrasive wheels, due primarily to the fact that these wheels must be of extremely accurate dimensions and also because, with the high percentage of synthetic resin used, bloating and blistering during the baking cycle is thereby avoided, and for other reasons. In using this heat and pressure method with A stage synthetic resin as a bond, and particularly where the bond exists in proportions over 25% by weight, the bond would bleed or run out in the mold under the action of heat and pressure, unless backed up by a sufficient amount of inert fillers. In the making of such wheels of the prior art, the conditions are, therefore, such that the inert fillers used are preponderant by weight over the amount of resin bond. For example, in a standard cup wheel using 15% by weight of diamond abrasive and 19% by weight of resin bond, the inert filler which may consist of aluminous flour, cryolite and iron oxide, would be as high as 66% by weight. Taking another example, say, of a standard peripheral wheel using about 29% of diamond abrasive by weight and 16% of resin bond by weight, the proportion of similar filler would be as high as 55% by weight. The filler is, therefore, high and preponderant in amount over the resin. It will also be noted that the resin bond is a relatively small proportion of the wheel content, being in the examples given 15% and 29% by weight.

I have found that it is the use of the necessarily large amount of filler that prevents the making by this method of diamond wheels which combine the properties of fast cutting and high durability. I have found that the inert fillers, selected as they are for promoting durability, have the effect of reducing the cutting ability. The fillers, to promote durability, possess resistance to abrasion, and by reason thereof the cutting ability of the wheel is made to suffer correspondingly. It is, of course, physically impossible to volumetrically replace a portion of these fillers with the A stage resin binder to induce freer and faster cutting, because of the nature of the bond under heat and pressure going through the liquid phase with a resulting bleeding out in the mold.

I have discovered the surprising phenomenon that the use of B stage resins as the initial bond very effectively solves the problem. This is surprising particularly because it is known that B stage resins for bonding abrasives are unworkable, primarily because these resins do not go through a liquid phase when heated. The main characteristic of B stage resin is that it is no longer fusible or soluble; if heated, it softens (but does not melt), and becomes rubber-like; it may swell in alcohol or ketones, but is not dissolved therein. It is a fact that B stage resins are unworkable in the making of abrasive wheels utilizing artificial abrasives such as alumina, silicon carbide and the like. In the general abrasive art, the abrasive grain is coarse (compared to the diamond abrasive field), and the volumetric proportion of the abrasive is relatively high (compared to the diamond abrasive field), the abrasive running from a minimum of 3 anywhere up to 6 to one volume of the resin bond. I have found that it is largely due to these conditions (relatively coarse abrasive and its high volumetric content) in the general abrasive art that B stage resins are unworkable and that only A stage resins can be used to make a bonded wheel of the desired strength. In the general abrasive art, most of the wheels are made not under combined heat and pressure but by cold molding and heat hardening. Of course, with cold molding and heat hardening, the use of B stage resins is out of the question.

I have discovered that the inert filler content of a diamond abrasive wheel may be sharply reduced even to the point of elimination if a B stage resin is used as the bond. I have further discovered that a B stage resin may be very effectively used as the bond and that its bond strength is even greater than an A stage resin and inert filler bond as obtained in prior methods. Due to the first discovery, the cutting ability of a given wheel is made faster and freer. Due to the second discovery, the durability of such a wheel is not impaired by rendering it faster cutting, but, on the contrary, is improved or enhanced. I have further found that such wheels are capable of producing an improved or superior finish when compared with diamond abrasive wheels of the prior art. The reasons for these phenomena may now be more readily explained.

By being enabled to sharply curtail the inert filler content of the wheel, the fast cutting retarding factor caused by the use of these fillers, particularly when they are used in the preponderant amounts above-mentioned, is eliminated. The result is that with a wheel having a given volumetric proportion of diamond abrasive and, therefore, having a desired cutting ability, the filler content may be so reduced in quantity as to eliminate the retarding effect thereof, so that the fast cutting ability desired is not impaired but is maintained in the resulting wheel.

The B stage resin particularly in its preponderant proportion (greater in amount than any possible amount of A stage resin) possesses durability characteristics superior to that of a combination of a lesser amount of A stage resin with a preponderant amount of inert filler. The B stage resin alone has a greater bond density (than an A stage resin), probably due to the higher solids content of these resins. The subsequent conversion or curing to the C stage is accomplished with practically no volatiles present (synthetic water or nitrogen), resulting in a denser final product. A B stage resin lacks the ability to go through a fluid phase (it coheres under the combined action of heat and pressure) upon heating and this enables the use of higher compressions, another factor in increasing the high bond strength. I believe it is due primarily to these reasons that the durability is not only not reduced (although the fast cutting ability is effectively increased), but is actually increased or enhanced.

When inert fillers are used in large quantities when combined with A stage resin, the resin bond is mineralized by the fillers, making the bond more vitreous in effect. A bond of this nature normally gives a rougher finish, other things being equal. I have found that where a B stage resin is used in preponderance in a diamond bonded abrasive wheel, the great reduction or even elimination of the inert fillers produces a resulting bond which is somewhat more elastic and which, therefore, yields a better and superior finish.

There results, therefore, a resin bonded diamond abrasive wheel having the characteristics of fast or free cutting and high durability and also the ability to produce a superior finish.

As an example of a B stage resin suitable for my purpose, I take:

| | |
|---|---|
| Phenol | cc__ 2,000 |
| 40% formaldehyde | cc__ 2,000 |
| P-phenol sulphonic acid | gram__ 1 |

These reagents are boiled in a kettle equipped for refluxing and stirred for approximately 3 hours at which point the condensed resin becomes striated and cloudy with a tendency to separate into two distinct components, namely, resin and water. At this point the resin is allowed to cool and the watery layer is decanted. The residual resin is boiled until a sample on cooling is a heavy viscous syrup. The temperature at this point is 105° C. At this temperature is added:

| | Grams |
|---|---|
| Methyl ethyl ketone | 100 |
| 40% formaldehyde | 300 |
| Para formaldehyde | 200 |

Boiling with slow stirring is continued until a sample when cooled is a heavy pasty mass. The temperature at this point will be approximately 110° C. and the resinous mass is run into pans to a depth of about 4 inches and charged into an oven heated at 200° F. for approximately 25 hours. After this oven treatment, the resin is a firm jell, resembling very soft vulcanized rubber, and is in the B stage. To make this B stage resin harder and more heat resistant, this rubbery jell is placed on heated differential rolls with ½ to 2 per cent of hexamethylenetetramine, and as the rolling proceeds, the resin progressively becomes firmer until it reaches a point where it begins to pulverize and fall off the rolls in a fine powdery form. The pulverized resin is screened and is ready for use, complying with all the properties inherent in B stage products.

While the herein described method of producing a B stage resin is eminently suitable for the bonding of diamond abrasive wheels, I find that commercially obtainable resins of this type are just as useful.

I will now give a number of examples of compounding and making the diamond abrasive wheels according to the present invention.

*Example 1*

As an example of a diamond bonded cup wheel made in accordance with my invention, I take as follows, all parts by weight:

| | Per cent |
|---|---|
| B stage resin | 50 |
| Alumina flour | 10 |
| Cryolite | 15 |
| #100 mesh diamond powder | 25 |
| | 100 |

The above materials are thoroughly mixed and spread on a preformed core supported in a mold equipped with a follower plate. The unit is transferred to a hydraulic press with heated platens, and is molded at 330° F. for 15 minutes at a pressure of approximately 2000 pounds per sq. in. The core and mold assembly should be of such accuracy that the cured or indurated wheel on discharging from the mold is ready for use. The use of a core is a commercial necessity because of the cost of the abrading material used. In the case of very small wheels, the use of a core is dispensed with.

It will be noted in this example that although the diamond abrasive is in amount by weight 25% of the wheel contents, the gravimetric amount of the resin bond is as high as 50%. Considering the specific gravities of the wheel ingredients as given below, it will be further noted that the volumetric ratio of the abrasive grain to the resin bond is about ⅙. It will also be noted that the gravimetric ratio of the resin bond to the inert filler is 2:1, the resin bond being, therefore, in considerable preponderance.

*Example 2*

As an example of a peripheral wheel which is also mounted on a core except in very small or very thin wheels, I take the following by weight:

|   | Per cent |
|---|---|
| B stage resin | 40 |
| Alumina flour | 7 |
| Cryolite | 8 |
| #120 mesh diamond powder | 45 |
|   | 100 |

The procedure for molding a peripheral wheel is carried out in the same manner as described above for the cup wheel.

In this example it will be noted that although the diamond grains are gravimetrically as high as 45% of the wheel content, the gravimetric amount of the resin bond is also very high, being 40%. It will be further noted that the volumetric ratio (with the specific gravities noted below) of abrasive grain to resin bond is almost ⅓. And again, it will be further noted that the gravimetric ratio of resin bond to filler is about 2.8.

*Example 3*

As a further example of a cup wheel, I take the following as indicated by both weight and volume (the specific gravities being also indicated):

|   | Specific gravity | Percent by weight | Percent by volume |
|---|---|---|---|
| Resin (B) | 1.35 | 47.28 | 69.40 |
| Alumina flour | 4.00 | 9.45 | 4.68 |
| Cryolite | 3.00 | 19.70 | 13.00 |
| Iron oxide | 5.20 | 2.36 | 0.92 |
| Diamond | 3.50 | 21.21 | 12.00 |
|   |   | 100.00 | 100.00 |

The procedure for molding the cup wheel is carried out in the same manner as described above.

It will be noted in this example that with the diamond abrasive in a gravimetric amount of about 21%, the resin bond is as high as 47%. It will be further observed that the volumetric ratio of abrasive grain to resin bond is about ⅙. It will be further seen that the gravimetric ratio of resin bond to inert filler is about 1.5.

*Example 4*

As a further example of a peripheral wheel made in accordance with my invention, I take the following, also indicated by weight and volume:

|   | Percent by weight | Percent by volume |
|---|---|---|
| Resin (B) | 42.35 | 65.80 |
| Alumina flour | 5.64 | 2.97 |
| Cryolite | 5.64 | 3.96 |
| Iron oxide | 2.82 | 1.14 |
| Diamond | 43.55 | 26.13 |
|   | 100.00 | 100.00 |

From this example it will be seen, similar to the peripheral wheel of Example 2, that with the high content of about 44% of abrasive grains, a very high resin content of 42% by weight is used. It will be further noted that the volumetric ratio of abrasive grain to resin bond is also close to ⅓. It will be further observed that the gravimetric ratio of resin bond to inert filler is about 3:1.

*Example 5*

By means of the invention, it is now possible to provide a wheel wherein the inert filler is entirely replaced with a binder, and the following is an example of such a wheel, the parts being taken by weight:

|   | Per cent |
|---|---|
| Resin (B) | 75 |
| Diamond powder | 25 |

From this it will be understood that the percentages of B stage resin given in the foregoing four examples can be varied to meet the demand for any type of service, even to the extent of entirely eliminating the inert filler content. Such concentrations of the resin binder have heretofore been impossible commercially, because of the limitation of the A stage resin used.

From this fifth example, it will be noted that the resin content is extremely high, and it will be further noted that the volumetric ratio of abrasive grain to resin bond is quite low (⅛). The gravimetric ratio of resin bond to inert filler in this case is, of course, infinite.

The high gravimetric (and volumetric) content of the resin and the high volumetric ratios of resin to filler being important characteristics of the product, the five examples above given may be generalized as follows, parts being taken by volume:

B stage resin _____ In the order of 60% to 90%
Inert filler _____ In the order of 0% to 20%
Diamond abrasive _____ In the order of 10% to 25%

It has already been explained above how this use of B stage resin in making diamond abrasive articles produces wheels which combine the characteristics of fast or free cutting and unusual durability, and which possess the further ability of producing a superior finish. I believe I have also ascertained why these B stage resins can be used at all in the manufacture of such diamond abrasive wheels where, as known, they cannot be used in the general abrasive art.

As above explained, in the general abrasive art the abrasive grains are relatively coarse (compared to the diamond abrasive wheel) and are high in volumetric ratio (from 3:1 to 6:1). Coarse abrasive particles can be characterized as those in the order of #8 to #24 mesh. By fine abrasive is usually meant particles of #46 mesh and finer. In the diamond abrasive wheel art the rule is the use of fine and very fine abrasives. As noted from the foregoing examples, instead of having a volumetric ratio of abrasive grain to bond of from 3 up to 6, the volumetric ratio runs in generally the reverse order, that is, from ⅓ to ⅛. This great volumetric reduction of abrasive particles (diamond) and the use of fine grain, when mixed with the B stage resin provide unitary structures of such character that the particles of B stage resin employed receive very full predetermined pressure in the baking cycle. The necessity for this is the fact that the ability for B stage resin particles to cohere is dependent upon combined heat and pressure. Apparently the ability to use B stage resins in an abrasive product of this nature is dependent on the particles of resin receiving the predetermined pressure unhampered by retarding agents such as the abrasive necessarily used. And so, if the percentage of abrasive is low in volume, the pressure on the B stage particles or grains is uninhibited, to the extent that proper coherence is obtainable. The fact that the abrasive is fine means that the pressure may be distributed throughout the mass almost as if the abrasive comprised all fine resin particles, and the resulting structure begins to take on the solidity and hardness as that wherein the B stage particles are pressed alone.

I do not limit myself to the fillers shown in the examples, inasmuch as other fillers may be also advantageously used such as different oxides of metal, quartz, pumice, etc. Of course, as noted above, the use of a filler may be also entirely eliminated.

The method of making the B stage resin bonded diamond abrasive articles according to the present invention and the advantages thereof will, in the main, be fully apparent from the above description. The prime important achievement thereof is the ability to make diamond abrasive wheels with a resin bond in which fast cutting ability and unusual durability are combined characteristics of the wheel. A further ancillary achievement is that such wheels also possess the ability of producing a superior finish. By means thereof, wheels of increased cutting quality or ability may be made without sacrifice of durability, and wheels of increased durability may be made without sacrifice of cutting ability. It has already been found in field practice that a so-called grade C-25 wheel made under the present invention is a faster cutting wheel than commercial A stage similarly graded wheels, and that its durability in much greater. The same comparison holds true with other graded wheels. Diamond abrasive wheels being in themselves very expensive products, the vast superiority of abrasive articles of the present invention over those of the prior art using a resin bond is immediately apparent.

I claim:

1. A diamond abrasive body comprising diamond abrasive grain bonded initially with a B stage synthetic resin of the phenol-aldehyde type cured to the C stage.

2. A diamond abrasive body comprising diamond abrasive grain bonded initially with a B stage synthetic resin of the phenol-aldehyde type cured to the C stage, and an inert filler, the resin being preponderant gravimetrically over the inert filler.

3. A diamond abrasive body comprising diamond abrasive grain bonded initially with a B stage synthetic resin of the phenol-aldehyde type cured to the C stage, and an inert filler, the resin being preponderant volumetrically over the combined abrasive grain and filler content.

4. A diamond abrasive body comprising diamond abrasive grain bonded initially with a B stage synthetic resin of the phenol-aldehyde type cured to the C stage, and an inert filler, the resin being preponderant volumetrically over the combined abrasive grain and filler content and the resin being preponderant gravimetrically over the inert filler.

5. A diamond abrasive body comprising diamond abrasive grain bonded initially with a B stage synthetic resin of the phenol-aldehyde type cured to the C stage, and an inert filler, in the following proportions by volume: diamond abrasive grain in the order of 10% to 25%, B stage resin in the order of 60% to 90%, and inert filler in the order of 0% to 20%.

6. A diamond abrasive body comprising diamond abrasive grain bonded initially with a B stage synthetic resin of the phenol-aldehyde type, cured under combined heat and pressure to the C stage, and an inert filler, the resin being preponderant volumetrically over the inert filler in the order of from 3:1 up.

7. A diamond abrasive body comprising diamond abrasive grain bonded initially with a B stage synthetic resin of the phenol-aldehyde type cured under combined heat and pressure to the C stage, the resin being preponderant volumetrically over the abrasive grain.

PAUL L. KUZMICK.